United States Patent [19]  
Kooijmans et al.

[11] 4,332,709  
[45] Jun. 1, 1982

[54] WATER-THINNABLE BINDERS AND THEIR PREPARATION

[75] Inventors: Petrus G. Kooijmans; Wolfgang Kunze; Arend Noordam, all of Amsterdam, Netherlands

[73] Assignee: Shell Oil Company, Houston, Tex.

[21] Appl. No.: 225,557

[22] Filed: Jan. 16, 1981

[30] Foreign Application Priority Data

Jan. 25, 1980 [GB] United Kingdom ............... 8002541

[51] Int. Cl.$^3$ .............................................. C08L 63/02
[52] U.S. Cl. ................................... 523/416; 204/181 C; 428/418; 525/533; 528/109; 528/114; 528/332; 528/335; 528/373; 523/418; 523/421
[58] Field of Search ............... 528/114; 260/29.2 EP, 260/29.3, 29.4 R; 525/533

[56] References Cited

U.S. PATENT DOCUMENTS

| | | | |
|---|---|---|---|
| 2,633,458 | 3/1953 | Shokal | 260/45.2 |
| 2,658,885 | 11/1953 | D'Alelio | 260/53 |
| 3,336,241 | 8/1967 | Shokal | 260/2 |
| 3,547,885 | 12/1970 | Dante et al. | 260/47 |
| 4,094,844 | 6/1978 | Allen et al. | 260/29.3 |
| 4,098,744 | 4/1978 | Allen et al. | 260/29.3 |
| 4,119,609 | 10/1978 | Allen et al. | 528/99 |

Primary Examiner—Theodore E. Pertilla  
Attorney, Agent, or Firm—Norris E. Faringer

[57] ABSTRACT

Water soluble binders for can lacquers are prepared by reacting an epoxy resin (polyglycidyl ether of polyhydric phenol) with an aliphatic amino carboxylic acid, e.g., (glycine, alanine, glutamic acid), wherein at least 50% of the acid groups have been neutralized with a base (alkali metal hydroxide, tertiary amine or quaternary ammonium hydroxide.)

13 Claims, No Drawings

WATER-THINNABLE BINDERS AND THEIR PREPARATION

FIELD OF THE INVENTION

The invention relates to the preparation of water-thinnable, heat-curable, thermosetting binders for coatings, especially for aqueous can lacquers.

BACKGROUND OF THE INVENTION

Solvent-based can lacquers, containing an epoxy resin and a cross-linking resin such as an aminoplast or phenolic resin are well-known. After application and during the heat-cure the solvent evaporates, and this is causing increasing concern in connection with air pollution regulations.

Two methods have been explored to develop a curable water-borne epoxy resin system: first, the epoxy resin ester approach, and second, the emulsion or dispersion approach. In the ester approach the epoxy resin is esterified with fatty acids and a sufficient amount of free carboxyl groups is taken up in the molecule to ensure, after neutralization, solubility in water. A serious drawback of such technique is that the ester bonds can be hydrolyzed in the water, and this type can therefore have insufficient storage stability.

In the emulsion or dispersion approach the unmodified epoxy resin is emulsified in the water, with the aid of suitable surfactants. The shortcomings of this technique results in the presence of the surfactant, which in the cured coating, will diminish the protective properties, and the application of such coatings with high speed roller coaters is often defective.

Recently, a third method has been proposed. To avoid these defects the epoxy groups of an epoxy resin are first reacted with the aminohydrogen of para-amino benzoic acid and then the carboxyl functions are neutralized to obtain a water-thinnable resin which can be cross-linked by aminoplast resins at usual baking schedules. See, for example, U.S. Pat. Nos. 4,094,844; 4,098,744 and 4,119,609.

The relatively high price and limited availability of para-amino benzoic acid limits the use of these compositions. Also, the resinous product requires a separate neutralization step.

SUMMARY OF THE INVENTION

The present invention provides novel water-thinnable, hydrolytically stable binders suitable for coating compositions and to a process for preparing said binders. These novel binders are based on epoxy resins and amino acids; the process permits preparation of water-thinnable neutralized binders in one stage or in two stages, and reaction conditions are moderate which is helpful in avoiding side reactions. The invention is defined as a process for the preparation of thermosetting binders which are water-soluble when neutralized with a base, characterized in that a polyglycidyl ether of a polyhydric phenol is reacted with an aliphatic amino acid in which at least 50% of the acid groups have been neutralized with a base, in a ratio of from 0.7 to 1.2 aminohydrogen equivalent per epoxy equivalent.

DESCRIPTION OF THE PREFERRED EMBODIMENTS

The epoxy resin used to prepare the instant water-thinnable, hydrolytically stable binders comprise those compounds containing at least one vicinal epoxy group; i.e., at least one

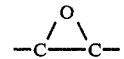

group. These polyepoxides may be saturated or unsaturated, aliphatic, cycloaliphatic, aromatic or heterocyclic and may be substituted if desired with non-interfering substituents such as halogen atoms, hydroxyl groups, ether radicals, and the like. They may also be monomeric or polymeric.

For clarity, many of the polyepoxides and particularly those of the polymeric type are described in terms of epoxy equivalent values. The meaning of this expression is described in U.S. Pat. No. 2,633,458. The polyepoxides used in the present process are preferably those having an epoxy equivalency greater than 1.0.

Various examples of liquid polyepoxides that may be used in the process of the invention are given in U.S. Pat. No. 2,633,458 and it is to be understood that so much of the disclosure of that patent relative to examples of polyepoxides is incorporated by reference into this specification.

Other suitable polyepoxides are disclosed in U.S. Pat. No. 3,547,885, among many others, and so much of the disclosure relevant to examples of epoxy compounds in U.S. Pat. No. 3,547,885 is incorporated by reference into this specification.

Other examples of suitable polyepoxides include the glycidyl ethers of novolac resins, i.e., phenol-aldehyde condensates. Preferred resins of this type are those of the formula:

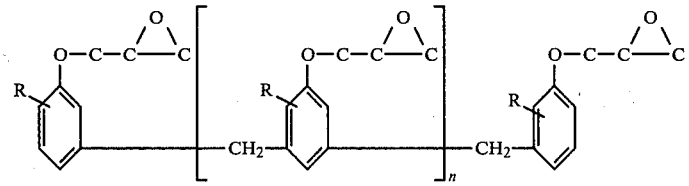

wherein R is hydrogen or an alkyl radical and n is an integer of 1 to about 10. Preparation of these polyepoxides is illustrated in U.S. Pat. No. 2,658,885.

Preferred polyepoxides are the glycidyl polyethers of polyhydric phenols and polyhydric alcohols, especially the glycidyl polyethers of 2,2-bis(4-hydroxyphenyl)propane having an average molecular weight between about 340 and 3,000 and an epoxide equivalent weight between about 170 and 2,000, and preferably between about 340 and 2,000 molecular weight, and more preferably, between about 340 and 1200.

Other suitable epoxy compounds include those compounds derived from polyhydric phenols and having at least one vicinal epoxy group wherein the carbon-to-carbon bonds within the six-membered ring are saturated. Such epoxy resins may be obtained by at least two well-known techniques, i.e., (1) by the hydrogenation of glycidyl polyethers of polyhydric phenols or (2) by the reaction of hydrogenated polyhydric phenols with epichlorohydrin in the presence of a suitable catalyst such as Lewis acids, i.e., boron trihalides and complexes thereof, and subsequent dehydrochlorination in an alkaline medium. The method of preparation forms no part of the present invention and the resulting saturated epoxy resins derived by either method are suitable in the present compositions.

Briefly, the first method comprises the hydrogenation of glycidyl polyethers of polyhydric phenols with hydrogen in the presence of a catalyst consisting of rhodium and/or ruthenium supported on an inert carrier at a temperature below about 50° C. This method is thoroughly disclosed and described in U.S. Pat. No. 3,336,241, issued Aug. 15, 1967.

The hydrogenated epoxy compounds prepared by the process disclosed in U.S. Pat. No. 3,336,241 are suitable for use in the present compositions. Accordingly, the relevant disclosure of U.S. Pat. No. 3,336,241 is incorporated herein by reference.

The second method comprises the condensation of a hydrogenated polyphenol with an epihalohydrin, such as epichlorohydrin, in the presence of a suitable catalyst such as $BF_3$, followed by dehydrohalogenation in the presence of caustic. When the hydrogenated phenol is hydrogenated Bisphenol A, the resulting saturated epoxy compound is sometimes referred to as "diepoxidized hydrogenated Bisphenol A", or more properly as the diglycidyl ether of 2,2-bis(4-cyclohexanol)propane.

In any event, the term "saturated epoxy resin", as used herein shall be deemed to mean the glycidyl ethers of polyhydric phenols wherein the aromatic ring structure of the phenols have been or are saturated.

An idealized structural formula representing the preferred saturated epoxy compounds is as follows:

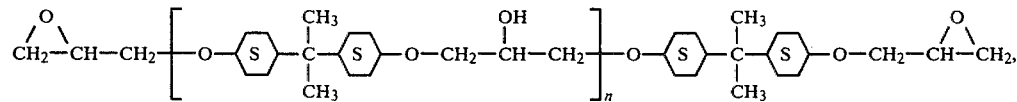

wherein n has a value so that the average molecular weight of the saturated polyepoxide is from about 340 to about 3000.

Preferred saturated epoxy resins are the hydrogenated resins prepared by the process described in U.S. Pat. No. 3,336,241. More preferred are the hydrogenated glycidyl ethers of 2,2-bis(4-hydroxyphenyl)propane, sometimes called the diglycidyl ethers of 2,2-bis(4-cyclohexanol)propane.

Polyglycidyl ethers which have molecular weights below 500 are also known as liquid epoxy resins, and those with higher molecular weights as solid epoxy resins.

Both types of epoxy resins can be used to prepare the instant binders, and the selection of epoxy resin will depend on product properties desired, such as inherent acidity, molecular weight, and amount of amino carboxylic acid to be used.

Polyglycidyl ethers of dihydric phenols have in general about 2 epoxy groups per molecule; these compounds can also be defined by the epoxy equivalent weight (WPE), which is easier to determine. Preferred polyglycidyl ethers have a WPE from about 170 to about 1500, preferably from 170 to 1000, and more preferably from about 170 to about 600. Mixtures of commercial epoxy resins may be used to obtain an average WPE of specified value.

The group of suitable aliphatic amino acids comprises the aliphatic carboxylic acids and the aliphatic sulphonic acids. Aliphatic in this connection means that amino and acidic groups are linked together through one or more, preferably up to 6, aliphatic carbon atoms. The amino acids have preferably not more than two amino hydrogen atoms per molecule, and more preferably one primary amino group per molecule. The amino carboxylic acids may be monocarboxylic acids or dicarboxylic acids; the amino sulphonic acids are preferably monosulphonic acids. Aliphatic carbon atoms linking the respective groups may be substitited by aromatic, cycloaliphatic or heterocyclic non-reactive substituents. The amino group may be in alpha, beta, gamma, delta or epsilon position with regard to an acid group. Alpha-amino acids may have the L-configuration (as known for naturally occurring amino carboxylic acids), the D-configuration or the DL-configuration.

Examples of amino monocarboxylic acids are glycine, phenyl glycine, alanine, beta-amino propionic acid, alpha-methyl-beta-amino propionic acid, serine, phenyl alanine, alpha-amino butyric acid, alpha-amino isobutyric acid, beta-amino butyric acid, gamma-amino butyric acid, methionine, valine, leucine, isoleucine, norleucine, and epsilon amino caproic acid. Examples of amino dicarboxylic acids are aspartic acid, glutamic acid, and beta-hydroxy glutamic acid. Other amino acids that may be considered are tyrosine, tryptophane, histidine, arginine, cystine, asparagine, glutamine. The latter group may be used in combination with polyglycidyl ethers having an epoxy molar mass up to 300. Mixtures of amino carboxylic acids may also be used.

Preferred amino carboxylic acids are glycine, alanine, and glutamic acid, the latter two preferably in the natural L-configuration; these amino acids are readily available, they have given very good results, and they do not give toxicity problems.

Mixtures of amino acids may also be used, for example mixtures of amino carboxylic acids and mixtures containing an amino sulphonic acid.

Before the reaction with the polyglycidyl ether the acid groups of the amino acid are at least partly neutralized with a base. Suitable bases are alkali metal hydroxides, such as sodium hydroxide or potassium hydroxide, quaternary ammonium hydroxides, tertiary amines or a mixture thereof.

The degree of neutralization is in general from about 50% to 100%, preferably at least 60% to 70%, and more preferably at least 90%. If desired, a small excess of neutralizing agent may also be used. The neutralization is preferably carried out in an aqueous medium. The neutralization of acidic groups promotes the solubilization of the aliphatic amino acids in the aqueous medium and their reactivity with the polyglycidyl ethers. The reaction of the polyepoxide and the amino acids in the present process is mainly an addition of NH-functions of the amino acid to epoxy groups; when an alkali metal hydroxide or a quaternary ammonium hydroxide is used as neutralizing agent there are hardly any side reactions, but when tertiary amines are used side reactions may occur, such as polymerization of the polyepoxide, esterification, quaternization, etc.

The equivalent ratio of aminohydrogen to epoxide is in general from about 0.7:1 to 1.2:1, and is preferably from about 0.9:1 to 1.1:1.

The polyglycidyl ether is conveniently dissolved in a small amount of a suitable organic solvent, at a temperature of 60° to 80° C. Suitable solvents are ether alcohols, for example, monomethyl, -ethyl, or -butyl ethers of ethylene glycol or propylene glycol; glycol esters for example ethylene glycol monoacetate or ethylene glycol monoethyl ether monoacetate; ketones, for example, methyl ethyl ketone, methyl isobutyl ketone, or cyclohexanone, or mixtures of these solvents. The amount of solvent can be kept rather small, say up to half the weight of the polyglycidyl ether. Its function is merely as a diluent, to reduce the viscosity of the polyepoxide at reaction temperature, and to assist in solubilization of the polyepoxide in the aqueous medium. Solvents of these types and in these amounts can usually be tolerated in aqueous coating compositions.

In the present process the aqueous solution of the at least partially neutralized amino acid is conveniently mixed with the diluted polyglycidyl ether at about 50° to 80° C. with stirring, and the mixture heated to about 90° to 100° C. where the exothermic reaction starts; the hazy solution then becomes clear within a rather short time, say about 15 minutes. The temperature can be kept under control by reflux of the water and solvent. This general and preferred scheme can be modified, if desired, in various ways: the solution of the neutralized amino acid can be added gradually to the solution of the polyglycidyl ether at 90° to 100° C., or the mixture may be kept for some time at about 100° C. to ensure completeness of reaction.

The order of addition does not make a difference in the performance of the cured coating, so the amino acid may be neutralized in a reactor and the diluted polyglycidyl ether added, or the polyglycidyl ether may be first placed in the reactor and the neutralized amino acid added.

The completed aqueous reaction product can be used for making thermosetting coating compositions in various manners. If the neutralizing agent is a tertiary amine or a quaternary ammonium hydroxide that will evaporate and/or decompose during stoving the aqueous solution as obtained can be used as a component in aqueous coating compositions for application by spraying, dipping, and anodic electrodeposition. A very suitable tertiary amine is, for example, 2-dimethylethanolamine, diethylethanolamine, triethanolamine, N-methyl piperidine, N-methyl morpholine, tripropylamine.

When the neutralizing agent was an alkali metal hydroxide such as NaOH or KOH, the final water-thinnable product may be applied onto a metal substrate by anodic electrodeposition, or the adduct itself may first be isolated from the aqueous solution. The binder, for example, can be precipitated by addition of an amount of acid which is equivalent with the amount of alkali metal hydroxide used for the neutralization, and isolated by filtration. Acids which can be used for the precipitation are, for example, mineral acids such as hydrochloric acid and phosphoric acid, or carboxylic acids such as acetic acid. The precipitate can then be washed with water and dried or redissolved in water with a volatile base such as ammonia or an amine, for use in a spray- or dip-lacquer. The dried precipitate can be used in the same manner, and further a use in powder coating compositions may be contemplated.

One advantage of the precipitation technique is that it allows isolation of the adduct economically. A further advantage is that the adduct as prepared does not contain products of side reactions. A third advantage is that the adduct can be dissolved with ammonia and/or volatile amines, if desired in the presence of volatile organic solvents, other than the base and/or solvent used for the addition reaction, and so allows use of components more specifically intended for making a final coating composition. For example, the amine does not need to be a tertiary amine, but may be a primary or secondary amine, or a mixture, provided only that the amine evaporates completely during stoving.

The amount of base used for dissolving the precipitated binder may be that just needed for dissolving the binder, or in excess to bring the solution to a pH as desired.

The aqueous binder compositions containing an at least partially neutralized adduct as described above may be further diluted with water, preferably demineralized water. The solutions may be clear or hazy or bluish, or may sometimes be considered as a dispersion.

In this field there is no sharp distinction between water-soluble and water-dispersible, but more a gradual transition. Water-thinnable comprises them all, and the main point is that the product can be diluted readily with water, without assistance of any surfactant or emulsion stabilizer, and still give stable aqueous dilutions.

For making an aqueous baking system the product as described above may be diluted with water (preferably deionized water) to produce a system of 10 to 30%w non-volatiles, and then a water-thinnable cross-linking resin may be added; alternatively, the cross-linking agent may be added before the dilution with water. Suitable cross-linking agents are in general water-soluble co-curing resins such as urea-formaldehyde resins, melamine-formaldehyde resins, and phenolic resins. Very suitable are the various polymethoxymethyl melamines, for example, hexamethoxymethyl melamine. The co-curing resins can be used in amounts as known in the art, for example, in weight ratios binder/co-curing resin 95/5 to 60/40.

The aqueous system (binder and cross-linking agent) may be applied to a suitable substrate by any suitable means, such as by brush, blade, roller, bar coater, by spraying, dipping, or by electrophoretic deposition. The resulting coating can then be cured by heating at usual temperatures for usual times, e.g., at 175° to 210° C. during 2 to 10 minutes (including warming-up time).

Of course, the conventional paint additives may be used in the coating compositions, such as pigments, fillers, plasticizers, thixotropic agents, etc.

The following examples are given to illustrate the preparation and use of the instant water-thinnable binders. It is understood that the examples are embodiments only and are given for the purpose of illustration only and the invention is not to be regarded as limited to any specific components and/or specific conditions recited therein. Unless otherwise indicated, parts and percentages are parts and percentages by weight.

MEK resistance is the number of rubs to be given to the cured coating with a piece of cotton cloth soaked in MEK (methyl ethyl ketone) to soften the surface. For sterilization resistance the panels were examined immediately after sterilization (90 minutes, water, 120° C.) for cross hatch tape adhesion and blushing. The polyepoxides used were polyglycidyl ethers of 2,2-bis(4-hydroxyphenyl)propane having the following epoxy equivalent weights (WPE):

Polyether A: WPE 186
Polyether B: WPE 237
Polyether D2: WPE 484
Polyether D4: WPE 475
Polyether E: WPE 940

The solvent is ethylene glycol monoethyl ether. DMAMP 80 is the abreviation for the tertiary amine 2-di-methylamino-2-methyl-1-propanol 80%w in water. Water is demineralized water.

EXAMPLE I

The reactor was a glass round-bottom flask equipped with stirrer, reflux condenser, and thermocouple. The reactor was charged with Polyether A (140 g; 0.75 epoxy equivalent) and solvent (40 g) and heated to 70° C. until the feed was homogeneous.

Glycine (30 g; 0.4 mol) was dissolved in water (80 g) and DMAMP 80 (64 g; 0.44 mol). The aqueous solution of neutralized glycine was added to the reactor with stirring, and the temperature was raised to 100° C. where the exothermic reaction started. After 15 minutes the milky solution was clear. It was diluted with 350 grams of water. Solids content calculated (polyepoxide+glycine):24.1%w; found: 23.5%w. Code: Binder A.

EXAMPLE II

The reaction scheme of Example I was used, but with the following components:

Reactor feed: Polyether D2 (193.6 g; 0.40 epoxy equivalent) and solvent (60 g).

Glycine 15.3 g; 0.204 mol) dissolved in water (21.6 g) and sodium hydroxide (8.4 g; 0.21 mol). After reaction the clear solution was diluted with water (700 g). This solution (binder B) had solids content calculated 21.3%w found: 22.5%w.

EXAMPLE III

The reaction scheme of Example I was used, but with the following components:

Reactor feed: Polyether A (140 g; 0.75 epoxy equivalent) and solvent (40 g).

Alamine (34.4 g; 0.386 mol) dissolved in water (80 g) and DMAMP 80 (64 g; 0.44 mol). After reaction the clear solution was diluted with water (350 g). This solution (binder C) had solids content calculated 24.6%w, found 23.0%w.

EXAMPLE IV

The reaction scheme of Example I was used, but with the following components:

Reactor feed: Polyether B (70 g; 0.295 epoxy equivalent), Polyether D4 (64 g; 0.135 epoxy equivalent), and solvent (50 g).

Glutamic acid (30 g, 0.204 mol) was dissolved in water (50 g) and DMAMP 80 (60 g; 0.41 mol). After reaction the clear solution was diluted with water (200 g). This solution (binder D) had solids content calculated 31.3%w, found 34.5%w.

EXAMPLE V

The reaction scheme of Example I was used, but with the following components:

Reactor feed: Polyether B(144 g; 0.606 epoxy equivalent) and solvent (50 g).

Glutamic acid (33 g; 0.224 mol) was dissolved in water (50 g) and DMAMP 80 (66 g; 0.45 mol). After reaction the clear solution was diluted with water (400 g). This solution (binder E) had solids content calculated 23.8%w, found 24.0%w.

EXAMPLE VI

The reaction scheme of Example I was used, but with the following modifications:

Reactor feed: Polyether D2 (193.6 g; 0.40 epoxy equivalent) and solvent (60 g).

Glycine (15.3 g; 0.204 mol.) dissolved in water (21.6 g) and potassium hydroxide (11.8 g; 0.21 mol.).

After reaction the clear solution was diluted with water (700 g), and the adduct was precipitated with acetic acid (12.6 g; 0.21 mol.) in water (200 g). The white precipitate was filtered with suction, washed with water, and redissolved in a mixture of water (750 g), solvent (60 g), and DMAMP 80 (30 g; 0.20 mol.).

Solids content calculated 20%w. Code: binder F.

EXAMPLE VII

The reaction scheme of Example I was used, but with the following modifications:

Reactor feed: Polyether E (188 g; 0.2 epoxy equivalent) and solvent (80 g).

Glycine (7.5 g; 0.1 mol.) dissolved in water (10.4 g) and potassium hydroxide (5.6 g; 0.1 mol.).

After reaction the clear solution was diluted with water (700 g) and the adduct precipitated with acetic acid (6.0 g; 0.1 mol.) in water (200 g). The white precipitate was filtered with suction, washed with water, and redissolved in a mixture of water (700 g), solvent (60 g) and DMAMP 80 (14.6 g; 0.1 mol.).

Solids content calculated: 20%w. Code: binder G.

EXAMPLE VIII

The reaction scheme of Example I was used, but with the following components:

Reactor feed: (Polyether D2 (96.8 g; 0.10 epoxy equivalent) and solvent (50 g).

Taurine (12.5 g; 0.1 mol.) dissolved in water (25 g) and sodium hydroxide (4.0 g; 0.1 mol.).

After reaction the clear solution was diluted with water (350 g).

Solids content calculated (Polyether+taurine) 20%w. Code: binder H.

EXAMPLE IX

Clear aqueous lacquers, numbered 1–8, were prepared from binders A–H by addition of water-soluble co-curing resins in the solids weight ratio 85/15 according to the following scheme:

| Lacquer | Binder | Co-curing resin |
|---|---|---|
| 1 | A | melamine resin, partially alkylated (No. 370) |
| 2 | B | hexamethoxymethyl melamine |
| 3 | C | phenolic resin (code LV 21/408) |
| 4 | D | hexamethoxymethyl melamine |
| 5 | E | phenolic resin (code LV 21/408) |
| 6 | F | hexamethoxymethyl melamine |
| 7 | G | hexamethoxymethyl melamine |

-continued

| Lacquer | Binder | Co-curing resin |
|---|---|---|
| 8 | H | hexamethoxymethyl melamine |

EXAMPLE X

Lacquer 2 was applied by electrodeposition onto aluminum panels (thickness 0.22 mm) and tinplate panels (quality E 2; thickness 0.23 mm), in three dilutions (solids content 5%w, 10%w and 20%w), with an iron cathode (electrode distance 3 cm), at various voltages and during various times (seconds). The coated panels were rinsed with water, and stoved at 200° C. during 1½ minutes peak metal temperature. Film thickness (micrometer) is given in Tables I to III.

TABLE I

Film thickness obtained with lacquer 2 (solids 5% w)

| | | voltage (v) | | | |
|---|---|---|---|---|---|
| | | 100 | 150 | 200 | 250 |
| Aluminium | | | | | |
| | 0.5 | 1 | 1 | 2–3 | 3–4 |
| Application | | | | | |
| time(s) | 1.0 | 1 | 2–3 | 4–5 | 6–7 |
| | 2.0 | 3–4 | 4–5 | 8–9 | — |
| Tin plate | | | | | |
| | 0.5 | 1–2 | 2–3 | 6 | 6–8 |
| Application | | | | | |
| time(s) | 1.0 | 3–5 | 5 | 10 | 11 |
| | 2.0 | 10–11 | 14–15 | 15–20 | — |

TABLE II

Film thickness obtained with lacquer 2 (solids 10% w)

| | | voltage (v) | | | | |
|---|---|---|---|---|---|---|
| | | 50 | 100 | 150 | 200 | 250 |
| Aluminium | | | | | | |
| | 0.5 | 1 | 1 | 2 | 3–4 | 5–6 |
| Application | | | | | | |
| time(s) | 1.0 | 1 | 1–2 | 5 | 5–7 | 9–10 |
| | 2.0 | 2–4 | 3–4 | 8–10 | — | — |
| Tin plate | | | | | | |
| | 0.5 | 1 | 1–2 | 5–6 | 6–8 | 8–10 |
| Application | | | | | | |
| time(s) | 1.0 | 3–4 | 6–8 | 8–9 | 11–12 | 15 |
| | 2.0 | 5–7 | 9–11 | 13–14 | — | — |

TABLE III

Film thickness obtained with lacquer 2 (solids 20% w), micrometers

| | | voltage (v) | | |
|---|---|---|---|---|
| | | 50 | 100 | 150 |
| Tin plate | | | | |
| | 0.5 | 1–2 | 3–4 | 7–8 |
| Application | | | | |
| time(s), | 1.0 | 2–3 | 7–8 | 10–11 |
| seconds | | | | |

The date in the tables show that at this electrode distance the thickness of the cured film can be regulated by voltage, application time, and solids content, and that a desired film thickness of about 5 micrometer can be obtained quite easily within the usual ranges of these parameters.

EXAMPLE XI

The lacquers 1–8 were examined for solvent resistance, pasteurization resistance, and sterilization resistance. Lacquers 2 and 8 were applied by electrodeposition as described in Example X, the other lacquers were applied by bar coater onto aluminum and tin plate panels of the same quality and thickness as in Example X (stoving time at 200° C.: 1½ minute peak metal temperature; film thickness 4–6 micrometers). Lacquers 1 and 4 to 8 qualified for >100 MEK double rubs, lacquer 2 withstood 80–100 MEK double rubs, and lacquer 3 withstood 50 MEK double rubs. The solvent resistance was therefore good to excellent.

Pasteurization resistance (demineralized water, 30 minutes at 70° C.) and sterilization resistance (demineralized water, 90 minutes at 120° C.) were excellent (no blushing).

EXAMPLE XII

Related results are obtained when an equivalent amount of KOH is used in lieu of the DMAMP.

What is claimed is:

1. A water-thinnable curable binder suitable for coatings which comprises reacting a polyglycidyl ether of a polyhydric phenol with an aqueous solution of an aliphatic amino acid in which at least 50% of the acid groups have been neutralized with a base, in a ratio of from about 0.7 to 1.2 aminohydrogen equivalents per epoxy equivalent.

2. The binder of claim 1 wherein the polyglycidyl ether is a polyglycidyl ether of 2,2-bis(4-hydroxyphenyl)propane having a weight between 340 and 2000 and a weight per epoxide of from about 170 to 1000.

3. The binder of claim 1 wherein the carboxyl functions of the amino acid have been at least partially neutralized with a base selected from the group consisting of an alkali metal hydroxide, a tertiary amine, and quaternary ammonium hydroxide.

4. The binder of claim 3 wherein the tertiary amine is 2-dimethylamino-2-methyl-1-propanol.

5. The binder of claim 3 wherein the alkali metal hydroxide is potassium hydroxide.

6. The binder of claim 1 wherein the amino acid is an amino carboxylic acid.

7. The binder of claim 6 wherein the amino carboxylic acid is glycine, alanine, or glutamic acid.

8. The binder of claim 1 wherein the amino acid is an amino sulphonic acid.

9. The binder of claim 1 wherein the neutralizing agent is an alkali metal hydroxide, characterized in that the binder is precipitated by acidification.

10. The binder of claim 1 wherein the binder is redissolved in an aqueous solution of ammonia or an amine.

11. An aqueous thermosetting coating composition comprising (A) the binder of claim 1, (B) a curing amount of a water-thinnable cross-linking resin, and (C) water.

12. The coating composition of claim 11 wherein the crosslinking agent is a melamine-formaldehyde resin.

13. The coating composition of claim 12 wherein the melamine-formaldehyde resin is a hexamethoxymethyl melamine.

* * * * *